United States Patent [19]

Scheurenbrand et al.

[11] Patent Number: 5,012,944

[45] Date of Patent: May 7, 1991

[54] MULTI-LAYERED PLASTIC CONTAINER PRODUCED BY COEXTRUSION BLOW-MOLDING

[75] Inventors: Dieter Scheurenbrand, Wolfschlugen; Helmut Wawra, Korb, both of Fed. Rep. of Germany

[73] Assignee: Daimler-Benz AG, Stuttgart, Fed. Rep. of Germany

[21] Appl. No.: 247,530

[22] Filed: Sep. 22, 1988

[30] Foreign Application Priority Data

Sep. 22, 1987 [DE] Fed. Rep. of Germany ....... 3731750

[51] Int. Cl.⁵ .............................................. B29C 17/07
[52] U.S. Cl. ...................................... 220/677; 220/689
[58] Field of Search ............... 215/12.2; 264/514, 515, 264/295, 296, 540, 531, 534

[56] References Cited

U.S. PATENT DOCUMENTS

| | | | |
|---|---|---|---|
| 3,547,294 | 12/1970 | Williams | 215/12.2 |
| 3,977,153 | 8/1976 | Schrenk | 264/515 |
| 4,281,769 | 8/1981 | Ignell | 215/12.2 |
| 4,378,328 | 3/1983 | Przytulla et al. | 264/534 |
| 4,501,781 | 2/1985 | Kushida et al. | 215/12.2 |
| 4,554,190 | 11/1985 | McHenry et al. | 220/415 |
| 4,796,766 | 1/1989 | Clark | 264/536 |

FOREIGN PATENT DOCUMENTS 2012365 10/1970 Fed. Rep. of Germany .
3520127 12/1986 Fed. Rep. of Germany .

Primary Examiner—Stephen Marcus
Assistant Examiner—Stephen Castellano
Attorney, Agent, or Firm—Evenson, Wands, Edwards, Lenahan and McKeown

[57] ABSTRACT

An arrangement is disclosed for improving the seam strength of plastic containers produced by coextrusion blow-molding which are provided with a diffusion barrier layer incompatible with the base material. To improve the seam strength, the same is therefore designed as a web seam which is folded in labyrinthal shape and the folds of which are welded to each other. The length of the web seam in the unfolded state is equivalent to at least three times the thickness of the coextrudate and the web seam is folded at least doubly.

2 Claims, 2 Drawing Sheets

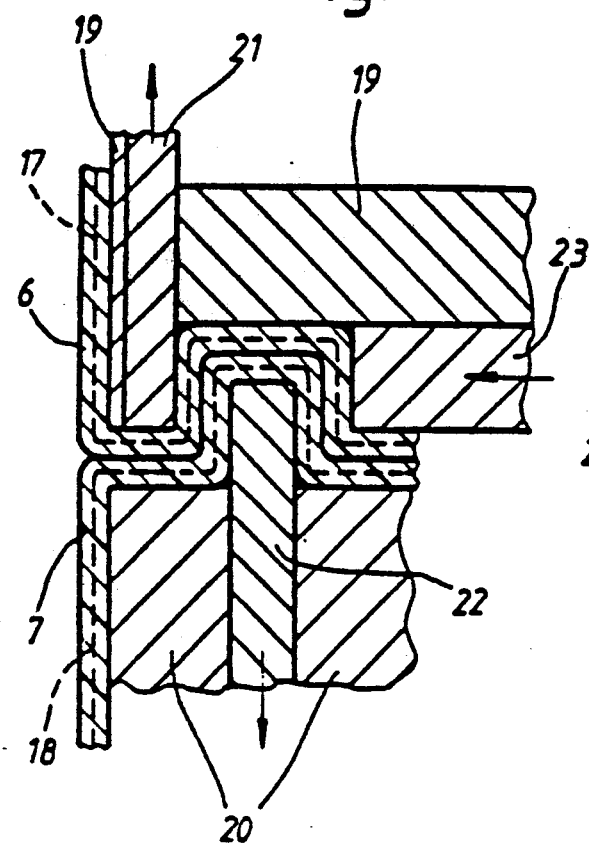
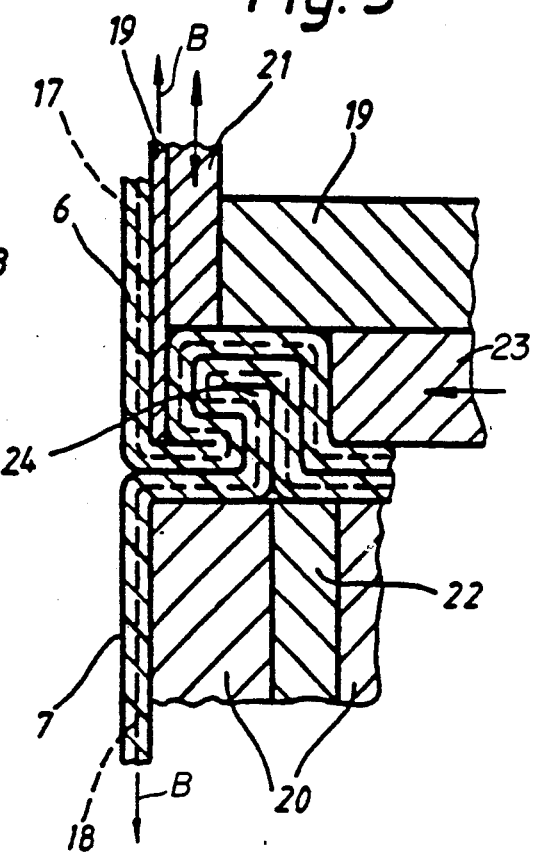
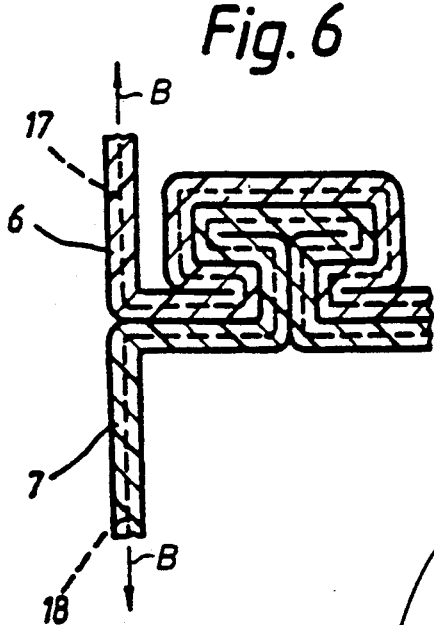
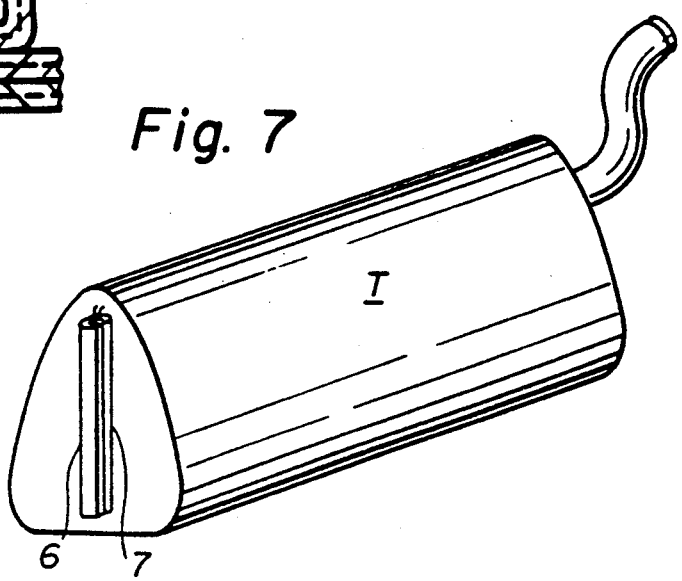

MULTI-LAYERED PLASTIC CONTAINER PRODUCED BY COEXTRUSION BLOW-MOLDING

BACKGROUND AND SUMMARY OF THE INVENTION

The invention relates to a multi-layered plastic container, produced by coextrusion blow-molding with web-shaped designed pinch seam.

Multi-layered plastic containers produced by coextrusion blow-molding are being increasingly used, since the multiplicity of layers allows the positive properties of various plastics to be combined. The container wall can consequently be provided with properties which either cannot be achieved with one raw material alone, or which would cause high material costs if a single raw material suitable in itself were to be used solely by itself.

Multi-layered containers are required for improving the barrier properties of the container wall to gases and vapors, which can be achieved by the application of a barrier layer without the deformation behavior or the stress-cracking resistance of the base material. As the barrier layer often consists of a material of a different type than that of the base material, a bonding agent layer is arranged between base material and barrier layer. For better mechanical protection, the barrier layer is often arranged between two base layers. For example a container wall built up in this way, looks as follows: Base layer (polyolefine) - bonding agent - barrier layer (polyamide) - bonding agent - base layer (polyolefine), the layer thickness of the barrier layers and bonding agent layers being small in comparison with the base layers. Extrusion blow-molding is well know per se. Further details concerning plastics which can be used and equipment details can be obtained for example from the two books "Extrusionsblasformen" (Extrusion Blow-Molding), publisher: Verein DE Ingenieure, VDI-Ges. Kunststoff-technik - VDI-Verlag Düsseldorf, 1979 and "Technologien des Blasformens", (Blow-Molding Techniques) which appeared in 1977 from the same publisher in the same publishing house.

When forming the neck and bottom pinch seams during the course of container production, a weakening of the wall occurs at these points. The base layer on the inside bonds in the accustomed way, but the barrier layer and base layer on the outside are virtually only severed. A force acting on the pinch seam consequently has to be absorbed by the base layer on the inside alone. As the barrier layers are not welded to each other, an increased diffusion also occurs in the same region.

Therefore, containers have become known wherein, to improve strength, the point of joining is made as a web seam protruding from the container. However, for reasons of appearance or space, often such a web seam cannot be used or not with a sufficient height, and furthermore its strength is also inadequate. This is often true in the case of sizeable containers.

An object of the invention is to provide a container on which the durability of the seam is substantially improved.

This object is achieved in the case of a container of the above-noted type by folding the web seam in labyrinthal or meandering shape with the folds of the web seam being welded to each other and positively interlocking in the direction to resist bursting forces from within. Here the length of the web seam in the unfolded state is equivalent to at least three times the thickness of the coextrudate, and wherein the web seam is folded at least doubly.

In the production of containers by blow-molding, the seam (pinch seam) is designed as a web, which is folded in labyrinthal or meandering shape and the folds are welded to each other. Good strengths are achieved if the web weld is folded at least doubly. Multiple folding with many more folds generally does not bring any improvement in the seam strength. It is, favorable if the length of the web seam in the unfolded state is at least three times the thickness of the coextrudate, i.e., is equivalent to the wall thickness of the container in the region of the welding point. It is particularly favorable if, as well as the welding, the folding achieve a positive bonding of the extrudite.

Other objects, advantages and novel features of the present invention will become apparent from the following detailed description of the invention when considered in conjunction with the accompanying drawings.

BRIEF DESCRIPTION OF THE DRAWINGS

FIGS. 4 and 5 show further partial sectional views extrudite of a web seam constructed in accordance with preferred embodiments of the invention, folded in a meandering shape and shown in respective pre-folded and welded construction;

FIG. 6 shows another design of a web weld constructed according to the invention, folded in a meandering shape;

FIG. 7 is a perspective schematic view of a vehicle fuel tank container depicting the location of a web seam constructed in accordance with the present invention.

DETAILED DESCRIPTION OF THE DRAWINGS

Figure 1:
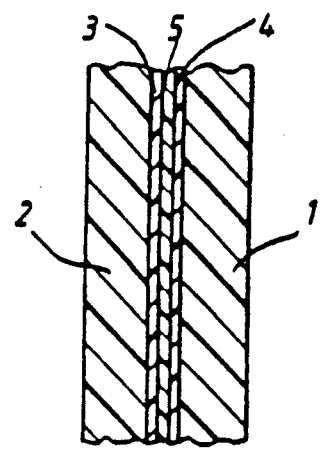
FIG. 1 shows a section through an extruded five-layer of the type usable in containers constructed according to preferred embodiments of the invention.

FIG. 1 shows diagrammatically the structure of a five-layer extrudite usable in forming a container. The extrudite consists of two supporting outer layers 1, 2 of polypropylene, two bonding-agent layers 3, 4 and a diffusion barrier layer 5 of polyamide in between.

In each of the seam constructions depicted in FIGS. 2 to 6, the inside of the container is on the left side of the figures.

Figure 2:
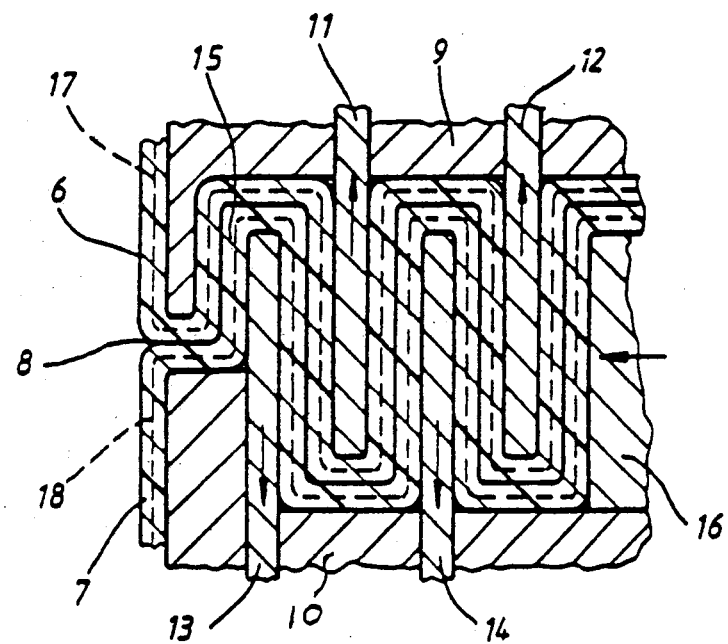
FIGS. 2 and 3 show partial sectional views of a container constructed in accordance with a preferred embodiment of the invention with a particularly simple web seam, shown in respective pre-folded and welded condition.
Figure 3:
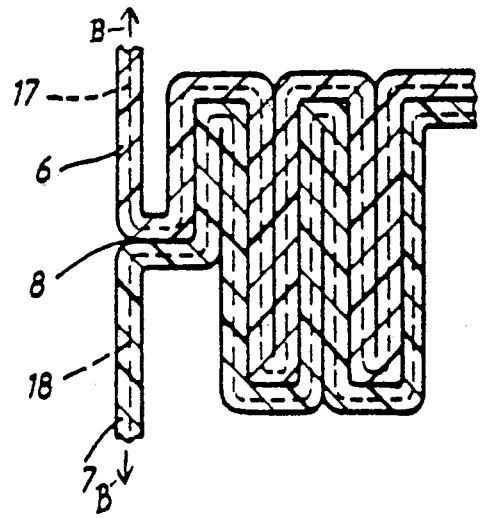

FIG. 2 shows a cutout of a container wall and a mold in the region of the seam of the container. The container wall consists of the two multi-layer extrudite 6 and 7, the barrier layer of which is in each case indicated by the dotted lines 17 and 18. The extrudite abut at 8 and enter the two mold halves 9 and 10. A meander-shaped fold formation is brought about in the web seam 15, formed by the extrudite 6 and 7, through the upper mold half 9 and the lower mold half 10 in conjunction with the slides 11 to 14 causing the extrudite 6 and 7 to be folded. When the slides 11, 12 and 13, 14 are withdrawn in the direction of the respective arrows into the upper and lower mold halves 9 and 10 in the disection of the respective arrows, respectively, and the slide 16 is operated in the direction of the arrow therein, the folds, previously formed, are pushed together to form the solid block which is approximately represented in FIG. 3, and in which the individual folds are welded to each other. Such a folded web seam, in which the folds are welded to each other is substantially more durable than a simple web seam. A container content diffusing from inside to outside of the container through the base layer of the extrudite 6, 7 has a long labyrinthal path ahead of it, along the diffusion barrier layers 17, 18, until it can reach the outside. Therefore, an odor nuisance from the container content, or a noticeable loss of substance of the container content, can be ruled out to a great extent.

In FIGS. 4 and 5, a further folded web seam is shown in the pre-stage and finished stage and wherein, apart from the welding of the two extrudite 6 and 7, the folds also positively interlock in the direction of bursting forces B. As a result, a considerable mechanical reinforcement of the web seam is achieved. The upper mold half 19 with the slide 21 and the lower mold half 20 with the slide 22 have the effect of imparting a hat-like profile on the web, consisting of the sheets 6 and 7, when the mold is closed. If the slide 21 is then drawn upwards, the slide 22 drawn downwards and the slide 23 shifted in the direction of the container wall, the folded and welded seam 24 shown in FIG. 5, is produced. The welding of the folds at the end of the folding on the container side may, if appropriate, be improved by a short subsequent downward pressing of the slide 21.

Another, particularly firmly folded and welded web seam is shown in FIG. 6. The "button-shaped" positive folding shown in FIG. 6 is mechanically particularly stable. In FIGS. 5 and 6, arrow B also indicates the container bursting force direction acting on the composite layers forming the container.

FIG. 7 schematically depicts a vehicle fuel tank container T with a web seam formed of extrudite 6 and 7 constructed according to the various embodiments depicted in FIGS. 1-6. It will be understood by those skilled in the art that the tank container could have other such web seams located in dependence on the shape of the tank and the particular molding configuration.

Folded and welded pinch seams are particularly appropriate in the case of containers which have a considerable volume and are to satisfy high requirements in terms of rupture strength and impact strength. The novel pinch seam profile compensates for the previously occurring weakening of the seam due to a diffusion barrier layer incompatible with the base layer of the blow-molding extrudite. The folded and welded pinch seam may be used with all materials or material combinations suitable for coextrusion blow-molding. 5. Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. Multi-layered plastic container, formed by blow-molding of a multi-layered coextrudate and with the multi-layer extrudate forming a web seam at a connection point where two identical multi-layered extrudate portions of the container are joined to each other by being folded in a labyrinthal L-shape transversely to the web seam;

the two identical multi-layers extrudite portions being welded to each other;

wherein the two extrudite portions of the fold positively interlock through multiple reverse foldings to resist bursting forces acting on the container walls from within; and wherein the length of the web seam prior to folding is equivalent to at least three times the thickness of the coextrudate, and wherein the web seam is folded at least once.

2. Container according to claim 1, wherein the fold is configured to form a button shaped positive folding pattern wherein the joined multi-layered extrudite portions are first folded 180° to overlie only a portion of each other, then folded 90° in a direction away from the overlie, then folded 90° to parallel the overlie portion and extend there beyond, then folded 90° to approach a plane defined by an extension of the overlie, then folded 90° to abut the first 180° and then folded 180° to be in line with the extrudite portions before they were folded 180°.

* * * * *